(12) United States Patent
Wang et al.

(10) Patent No.: US 11,189,857 B2
(45) Date of Patent: Nov. 30, 2021

(54) BATTERY MODULE

(71) Applicant: CONTEMPORARY AMPEREX TECHNOLOGY CO., LIMITED, Ningde (CN)

(72) Inventors: Zhi Wang, Ningde (CN); Lin Ma, Ningde (CN); Feng Qin, Ningde (CN); Liangyi Wang, Ningde (CN); Liangmei Chen, Ningde (CN); Xiaofan Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 171 days.

(21) Appl. No.: 16/549,558

(22) Filed: Aug. 23, 2019

(65) Prior Publication Data

US 2020/0099025 A1 Mar. 26, 2020

(30) Foreign Application Priority Data

Sep. 26, 2018 (CN) .......................... 201821570726.9

(51) Int. Cl.
*H01M 10/04* (2006.01)
*H01M 10/28* (2006.01)
(Continued)

(52) U.S. Cl.
CPC ..... *H01M 10/0413* (2013.01); *H01M 10/281* (2013.01); *H01M 10/482* (2013.01);
(Continued)

(58) Field of Classification Search
CPC ............. H01M 50/204; H01M 50/242; H01M 50/296; H01M 50/243; H01M 50/271;
(Continued)

(56) References Cited

U.S. PATENT DOCUMENTS 8,235,732 B2 * 8/2012 Garascia ............. H01M 50/543
439/76.2
9,620,761 B2 * 4/2017 Smith ................. H01M 50/502
(Continued)

FOREIGN PATENT DOCUMENTS

| EP | 3343666 | 4/2018 |
|---|---|---|
| KR | 20130116446 | 10/2013 |

OTHER PUBLICATIONS

European Office Action for European Application No. EP19179315.7 dated Dec. 11, 2019.
(Continued)

*Primary Examiner* — Gregg Cantelmo
(74) *Attorney, Agent, or Firm* — Gardner, Linn, Burkhart & Ondersma LLP

(57) ABSTRACT

The present disclosure relates to the technical field of battery, and particularly to a battery module. The battery module includes a case body having a cavity, a plurality of battery units accommodated in the cavity of the case body, an output electrode assembly disposed on the case body and electrically connected to output terminals of the plurality of battery units, and an end cap connected to the case body and arranged to press and cover at least a part of the output electrode assembly. The battery module according to the present disclosure has a sound design, through which the airtightness of the output electrode assembly is not liable to be broken during the running of the vehicle.

12 Claims, 3 Drawing Sheets

(51) Int. Cl.
  *H01M 10/48*   (2006.01)
  *H01M 50/242*  (2021.01)
  *H01M 50/204*  (2021.01)
  *H01M 50/296*  (2021.01)
  *H01M 50/271*  (2021.01)

(52) U.S. Cl.
  CPC ....... *H01M 50/204* (2021.01); *H01M 50/242* (2021.01); *H01M 50/271* (2021.01); *H01M 50/296* (2021.01)

(58) Field of Classification Search
  CPC ............. H01M 50/289; H01M 50/291; H01M 10/0413; H01M 10/281; H01M 10/482
  See application file for complete search history.

(56) References Cited

U.S. PATENT DOCUMENTS

| | | |
|---|---|---|
| 2005/0191543 A1 | 9/2005 | Harrington |
| 2011/0237139 A1* | 9/2011 | Lee ........................ H01M 50/20 439/754 |
| 2011/0300424 A1 | 12/2011 | Kim et al. |
| 2016/0336577 A1 | 11/2016 | Eom et al. |
| 2017/0263394 A1* | 9/2017 | Higuchi ................... H05K 5/03 |

OTHER PUBLICATIONS

European Search Report for European Application No. EP19179315.7 dated Oct. 7, 2019.

\* cited by examiner

BATTERY MODULE

CROSS-REFERENCE TO RELATED APPLICATIONS

The present application claims priority to Chinese Patent Application No. 201821570726.9, filed on Sep. 26, 2018, the content of which is incorporated herein by reference in its entirety.

TECHNICAL FIELD

The present disclosure relates to the technical field of battery, and in particular, relates to a battery module.

BACKGROUND

In recent years, the new energy vehicles have played a pivotal role in promoting social development and environmental protection. The battery cell, as the power source of new energy vehicles to ensure the normal operation of new energy vehicles, is the core component of new energy vehicles. The battery cell is usually placed in a case made of a plastic or composite material, and then the case is sealed with a metal frame to form a battery module, ensuring the airtightness of the entire battery module. Specifically, in order to guarantee that the battery module can provide sufficient power for the new energy vehicle, voltage output terminals of battery modules are usually required to be connected with one another through metal connecting members, thereby achieving a long-distance travel of the new energy vehicle.

Despite of the above functions, the battery module in the related art may vibrate during the travel of the vehicle, and thus the metal connecting member between adjacent battery modules may pull the connected voltage output terminals, thereby breaking the airtightness of the voltage output terminals of the battery module. Thus, there is a technical problem relating to the deficient structural design of the battery module.

SUMMARY

The present disclosure provides a battery module, aiming to alleviate the technical problem relating to the deficient structural design of the battery module.

The present disclosure provides a battery module, including a case body having a cavity, a plurality of battery units accommodated in the cavity of the case body, an output electrode assembly disposed on the case body and electrically connected to output terminals of the plurality of battery units, and an end cap connected to the case body and configured to press and cover at least a part of the output electrode assembly.

The output electrode assembly includes an output electrode body electrically connected to the output terminal of the plurality of battery units, and an electrode insulator disposed on the case body and configured to wrap the output electrode body. A surface of the end cap to be matched with the electrode insulator is recessed to form a first groove, and the first groove is configured to accommodate the electrode insulator.

A part of the electrode insulator contacting the first groove is in contact with a side wall of the first groove.

The output electrode assembly further includes a connecting portion connected to the electrode insulator. A bottom of the first groove is recessed to form a second groove. The second groove fits and limits the connecting portion, and the connecting portion is in contact with a side wall of the second groove.

The connecting portion is a flared protrusion structure.

The case body includes two side plates, two end plates, and the cavity of the case body is enclosed by the two side plates and the two end plates. The output electrode assembly is arranged on any one of the two end plates, a locating piece is provided on an end of each of the two side plates close to the end cap, and the locating piece matches with and limits the end cap.

The locating piece includes a connecting arm connected to each of the two side plates, and a fixed arm connected to the connecting arm in a non-zero angle with respect to the connecting arm. The end cap is clamped by the fixed arm corresponding to each of the two side plates.

The fixed arm is connected to the connecting arm via an arc transition.

A surface of the end cap to be matched with the fixed arm is an arc surface.

The end cap is provided with a plurality of through-holes.

The present disclosure brings following beneficial effects.

The battery module provided by the present disclosure includes a case body, a plurality of battery units accommodated in the cavity of the case body, an output electrode assembly disposed on the case body, and an end cap connected to the case body. The output electrode assembly is electrically connected to output terminal of the battery units to ensure normal voltage output of the battery units, and the end cap is arranged to press and cover a part of the output electrode assembly. When the battery module vibrates during the driving of the vehicle and the output electrode assembly is pulled by the metal connecting member due to the vibration of the battery module, as a part of the output electrode assembly is pressed and covered by the end cap, the force applied by the metal connecting member is dispersed to the end cap. In the meantime, the end cap that tightly pressed against the surface of the output electrode assembly can further prevent the airtightness of the output electrode assembly from being broken by intensive swaying of the metal connecting member.

BRIEF DESCRIPTION OF DRAWINGS

In order to more clearly illustrate embodiments of the present disclosure and technical solution of the related art, the accompanying drawings used in the embodiments or the description of the related art are briefly described below. The drawings described below are merely a part of the embodiments of the present disclosure. Based on these drawings, those skilled in the art can obtain other drawings without any creative efforts.

REFERENCE SIGNS

Figure 1:
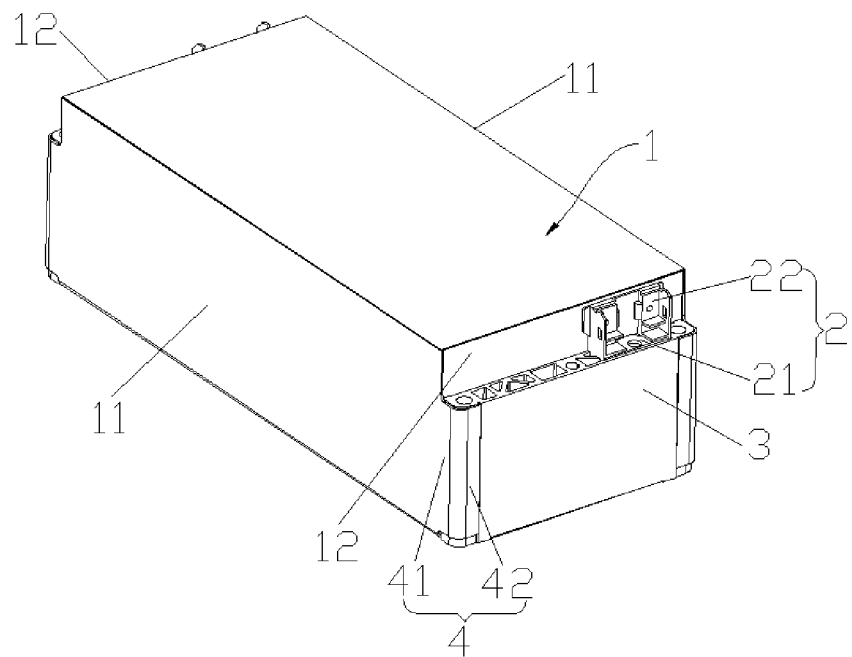
FIG. 1 is a structural schematic diagram of a battery module according to an embodiment of the present disclosure.

1—case body;
11—side plate;

12—end plate;
2—output electrode assembly;
21—output electrode body;
22—electrode insulator;
23—connecting portion;
3—end cap;
31—first groove;
32—second groove;
33—through-hole;
4—locating piece;
41—connecting arm;
42—fixed arm.

DESCRIPTION OF EMBODIMENTS

The embodiments of the present disclosure will be clearly, comprehensively described in combination with the drawings. The embodiments described below are merely a part of the embodiments of the present disclosure. Based on these embodiments described in the present disclosure, other embodiments obtained by those skilled in the art without any creative efforts shall fall within the protection scope of the present disclosure.

It should be understood that terms indicating orientations or positions, such as "inside", "outside", etc., generally are used to describe the orientations or positions with reference to the drawings. These terms are merely intended to facilitate and simplify the description of the present disclosure, rather than indicate or imply that a device or element is disposed at a fixed position or is operated in a fixed orientation or configuration. That is, these terms should not be construed as limitations of the present disclosure.

It should be noted that terms used in the present disclosure such as "mounted", "assembled", and "connected", etc. shall be understood in a broad extent, unless otherwise specified or limited. For example, the term "connected" includes various connection manners, such as fixed connection, detachable connection, integrated connection; mechanical connection, electrical connection; direct connection, indirect connection via an intermediate medium, or internal connection of two elements. These skilled in the art are able to understand specific meanings of the above terms in accordance with specific circumstances.

As shown in FIG. 1, FIG. 2, FIG. 4, FIG. 5 and FIG. 6, the present embodiment provides a battery module. The battery module includes a case body 1, a plurality of battery units accommodated in the cavity of the case body 1, an output electrode assembly 2 disposed on the case body 1, and an end cap 3 connected to the case body 1. The output electrode assembly 2 is electrically connected to output terminals of the battery units to ensure normal voltage output of the battery units, and the end cap 3 is arranged to press and cover a part of the output electrode assembly 2. When the battery module vibrates during the travelling of the vehicle and the output electrode assembly 2 is pulled by a metal connecting member due to the vibration of the battery module, as a part of the output electrode assembly 2 is pressed and covered by the end cap 3, the force applied by the metal connecting member is dispersed to the end cap 3. In the meantime, the end cap 3 being tightly pressed against the surface of the output electrode assembly 2 can further prevent the airtightness of the output electrode assembly 2 from being broken by intensive swaying of the metal connecting member.

The end cap 3 is connected to the case body 1 by bonding, snap-in, or the like. In order to improve the connection strength between the end cap 3 and the case body 1, the end cap 3 is preferably fixed to the case body 1 by bolts in the present embodiment.

As shown in FIG. 2, FIG. 3, FIG. 5 and FIG. 6, the end cap 3 can be directly pressed against the surface of the output electrode assembly 2 to prevent the metal connecting member from pulling the output electrode assembly 2. The output electrode assembly 2 may include an output electrode body 21 electrically connected to the output terminals of the battery units, and an electrode insulator 22 disposed on the case body 1. The electrode insulator 22 wraps the output electrode body 21. A surface of the end cap 3 to be matched with the electrode insulator 22 is recessed to form a first groove 31, and the first groove 31 is used for accommodating the electrode insulator 22. By placing the output electrode body 21 in the first groove 31, the stability of the connection between the end cap 3 and the output electrode body 21 is improved. At the same time, the contact area between the output electrode body 21 and the end cap 3 is enlarged, such that the end cap 3 is tightly pressed against the surface of the output electrode assembly 2, thereby preventing the airtightness of the output electrode assembly 2 from being broken by the intensive swaying of the metal connecting member.

As shown in FIG. 2, FIG. 3, FIG. 5 and FIG. 6, when the battery module vibrates, the metal connecting member pulls the output electrode assembly 2 mainly in a direction towards the end cap 3, that is, along an X-axis direction (a connecting direction of the two end plates 12). Since the electrode insulator 22 is disposed in the first groove 31 of the end cap 3, the end cap 3 applies a force in a direction opposite to the X-axis direction (the connecting direction of the two end plates 12) to the electrode output member, thereby decomposing the force of the metal connecting member applying on the electrode insulator 22. In this way, the airtightness of the output electrode assembly 2 is prevented from being broken by the intensive swaying of the metal connecting member.

Figure 5:
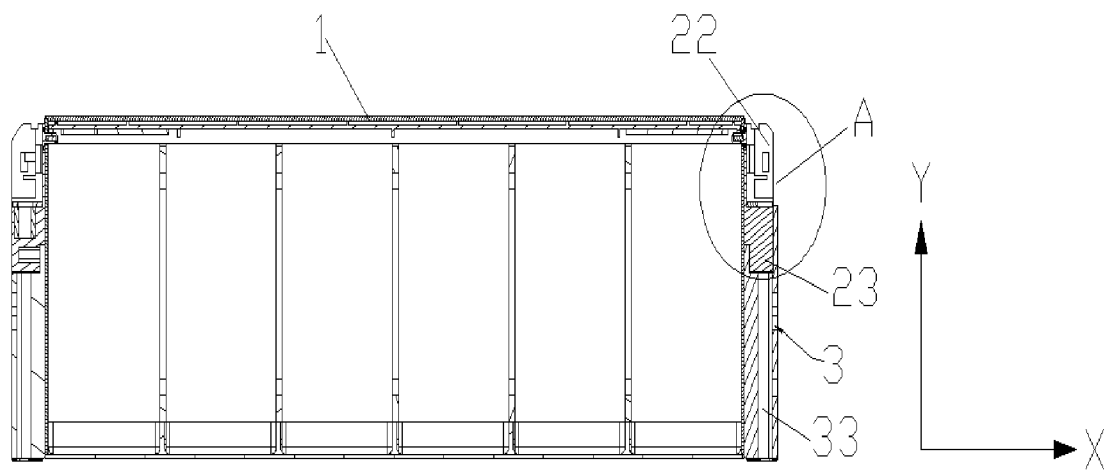
FIG. 5 is a cross-sectional view taken along line A-A in FIG. 4.
Figure 6:
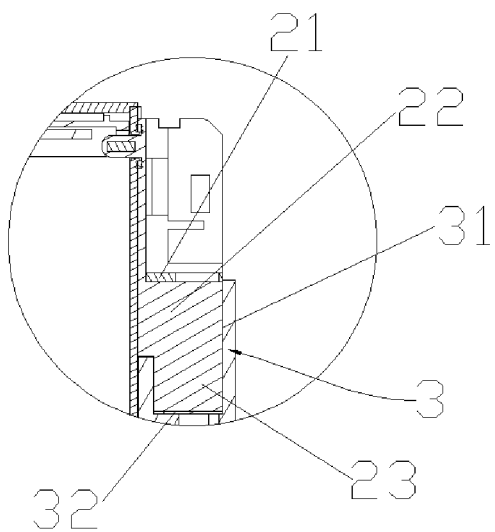
FIG. 6 is an enlarged view of a portion A in FIG. 5.

As shown in FIG. 5 and FIG. 6, the electrode insulator 22 can be partially or integrally disposed in the first groove 31. In the embodiment, the depth of the first groove 31 can be reduced as much as possible, so as to ensure the strength of the end cap 3 itself, while the end cap 3 can be tightly pressed against the surface of the electrode insulator 22. Preferably, the first groove 31 is in contact with a part of the electrode insulator 22, and the first groove 31 is a non-through groove.

In order to achieve a good insulation effect of the electrode insulator 22, the electrode insulator 22 can be made of one or more of polyethylene, polypropylene or polyimide, and the electrode insulator 22 wraps the output electrode body 21 by injection molding with rubber.

In addition, the electrode insulator 22 may also be not in contact with a side wall of the first groove 31. In order to ensure that the end cap 3 can be tightly pressed against the electrode insulator 22a while reducing a pulling force applied on the electrode insulator 22 by the metal connecting member in any direction, the part of the electrode insulator 22 contacting the first groove 31 is in contact with the side wall of the first groove 31.

Further referring to FIG. 5 and FIG. 6, the output electrode assembly 2 further includes a connecting portion 23 connected to the electrode insulator 22. A bottom of the first groove 31 is recessed to form a second groove 32. The second groove 32 fits and limits the connecting portion 23, and the connecting portion 23 is in contact with a side wall of the second groove 32. With such structure, the stability of the connection between the end cap 3 and the output electrode body 21 can be improved, and the contact area between the output electrode body 21 and the end cap 3 is enlarged at the same time, thereby preventing the airtightness of the output electrode assembly 2 from being broken by the intensive swaying of the metal connecting member.

The part of the electrode insulator 22 contacting the first groove 31 is in contact with the side wall of the first groove 31, and the connecting portion 23 is in contact with the side wall of the second groove 32. The contact can be a partial contact or complete contact, which is not specified in the present disclosure.

The connecting portion 23 and the electrode insulator 22 can be connected together by bonding, snap-in or screwing, etc., in order to improve the connection strength between the connecting portion 23 and the electrode insulator 22. For example, the connecting portion 23 and the electrode insulator 22 may be formed into one piece.

Figure 2:
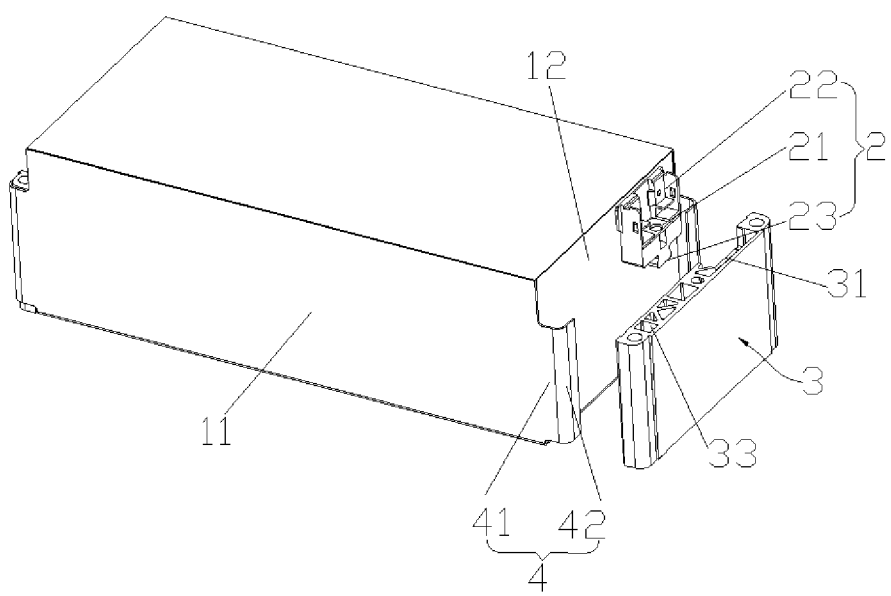
FIG. 2 is an exploded view of a case and an end cap of FIG. 1.
Figure 3:
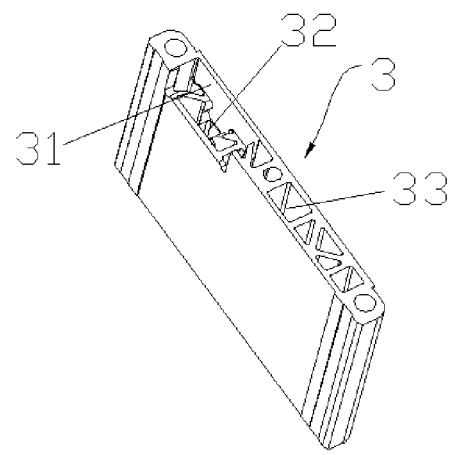
FIG. 3 is a structural schematic diagram of the end cap of FIG. 1.
Figure 4:
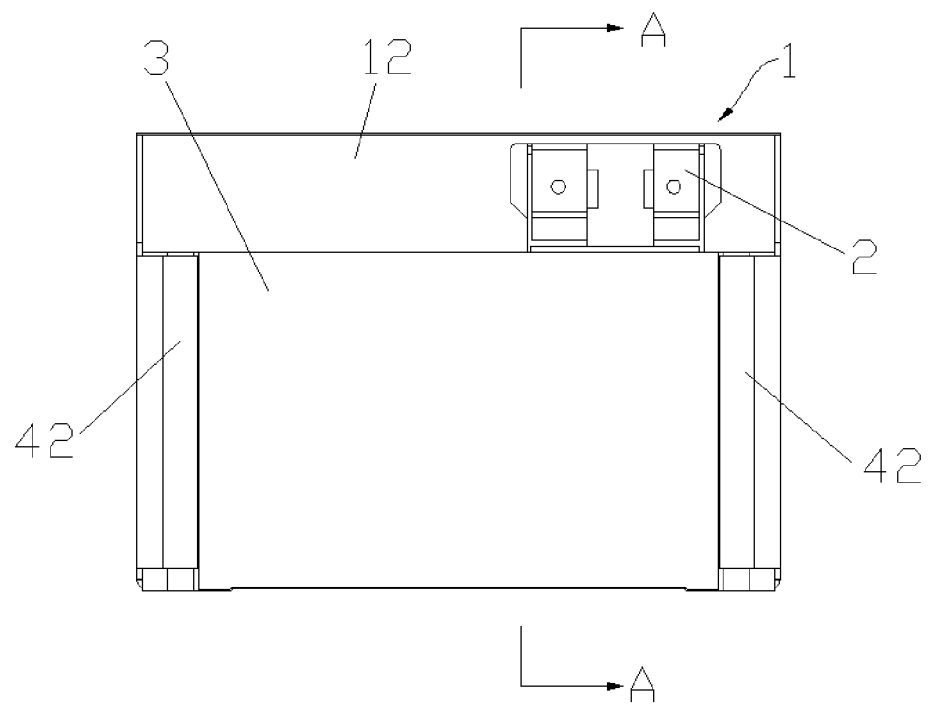
FIG. 4 is a right side view of FIG. 1.

As shown in FIG. 2, in order to improve the firmness and stability of the connection between the connecting portion 23 and the second groove 32, in the present embodiment, the connecting portion 23 may be a flared protrusion structure.

As shown in FIG. 1 and FIG. 2, the case body 1 includes two side plates 11 and two end plates 12, and the two side plates 11 and the two end plates 12 are connected, head to tail, to enclose the cavity of the case body. The output electrode assembly 2 is arranged on any one end plate 12. In order to firmly and easily connect the end cap 3 to the case body 1, a locating piece 4 is provided on an end of the side plate 11 close to the end cap 3, and the locating piece 4 fits and limits the end cap 3.

The locating piece 4 includes a connecting arm 41 connected to the side plate 11, and a fixed arm 42 connected to the connecting arm 41. A non-zero angle is enclosed by the connecting arm 41 and the fixed arm 42. The end cap 3 is clamped between the fixed arms 42 corresponding to different side plates 11. With such structure, the clamping force of the two fixed arm 42 can primarily connect the end cap 3 to the case body 1, which facilitates the further fixing of the end cap 3, and can further improve the stability of the connection between the end cap 3 and the case body 1.

The connecting arm 41 and the side plate 11 can be connected together by bonding, or snap-in, etc., and the fixed arm 42 and the connecting arm 41 can be connected together by bonding, or snap-in, etc. In order to improve the connection strength between the connecting arm 41 and the end plate 12 and the connection strength between the fixed arm 42 and connecting arm 41, the connecting arm 41 and the end plate 12 may be formed into one piece, and the fixed arm 42 and the connecting arm 41 may be formed into one piece.

The fixed arm 42 can be connected to the connecting arm 41 via a sharp corner transition. In the present embodiment, for example, the fixed arm 42 may be connected to the connecting arm 41 via an arc transition. By connecting the connecting arm 41 and the fixed arm 42 with the arc transition, a stress at the connection between the fixed arm 42 and the connecting arm 41 can be uniformly distributed along a normal of the arc. In this way, a product failure, which is caused by the occurrence of cracks at the connection structure, can be reduced or even avoided, thereby further increasing the clamping force of the fixed arm 42 against the end cap 3.

As shown in FIG. 2, a surface of the end cap 3 to be matched with the fixed arm 42 can be a flat surface. In order to increase the contact area between the end cap 3 and the fixed arm 42 and enhance the stability of the end cap 3, the surface of the end cap 3 to be matched with the fixed arm 42 can be an arc surface.

As shown in FIG. 5, in the present embodiment, the end cap 3 is provided with multiple through-holes 33 to reduce a weight of the end plate 12. The through-holes 33 are provided along the X axis direction (the connection direction of the two end plates 12). In order to further reduce the weight of the end plate and ensure the structural strength of the end plate 12, the through-holes 33 may be also provided along the Y axis direction (a direction perpendicular to the connection direction of the two end plates 12) at the same time.

It should be noted that the embodiments discussed above are merely intended to illustrate the technical solutions of the present disclosure, rather than limit the present disclosure. Although the above embodiments describe the present disclosure in detail, those skilled in the art can understand that the technical solution of the present disclosure can be modified, and parts or all of the technical features can be equivalently replaced. Any modifications or equivalent replacements within the spirit and principles of the present disclosure should be included in the scope of protection of the present disclosure.

What is claimed is:

1. A battery module, comprising:
    a case body having a cavity;
    a plurality of battery units accommodated in the cavity of the case body;
    an output electrode assembly disposed on the case body and electrically connected to output terminals of the plurality of battery units; and
    an end cap connected to the case body, wherein the end cap presses and covers at least a part of the output electrode assembly;
    wherein the output electrode assembly comprises:
        an output electrode body electrically connected to the output terminals of the plurality of battery units;
        an electrode insulator disposed on the case body, wherein the electrode insulator wraps the output electrode body; and
        a connecting portion connected to the electrode insulator;
    wherein a surface of the end cap to be matched with the electrode insulator is recessed to form a first groove, and the first groove accommodates the electrode insulator; and
    wherein a bottom of the first groove is recessed to form a second groove, the second groove fits and limits the connecting portion, and the connecting portion is in contact with a side wall of the second groove.

2. The battery module according to claim 1, wherein a part of the electrode insulator contacting the first groove is in contact with a side wall of the first groove.

3. The battery module according to claim 1, wherein the connecting portion is a flared protrusion structure.

4. The battery module according to claim 1, wherein the case body comprises:
    two side plates; and
    two end plates,
    wherein the cavity of the case body is enclosed by the two side plates and the two end plates, and the output electrode assembly is arranged on any one of the two end plates, and
    wherein a locating piece is provided on an end of each of the two side plates close to the end cap, and the locating piece fits and limits the end cap.

5. The battery module according to claim 4, wherein the locating piece comprises:
   a connecting arm connected to each of the two side plates; and
   a fixed arm connected to the connecting arm in a non-zero angle with respect to the connecting arm,
   wherein the end cap is clamped by the fixed arms corresponding to the two side plates.

6. The battery module according to claim 5, wherein the fixed arm is connected to the connecting arm via an arc transition.

7. The battery module according to claim 6, wherein a surface of the end cap to be matched with the fixed arm is an arc surface.

8. The battery module according to claim 1, wherein the end cap is provided with a plurality of through-holes.

9. A battery module, comprising:
   a case body having a cavity;
   a plurality of battery units accommodated in the cavity of the case body;
   an output electrode assembly disposed on the case body and electrically connected to output terminals of the plurality of battery units; and
   an end cap connected to the case body, wherein the end cap presses and covers at least a part of the output electrode assembly,
   wherein the case body comprises two side plates and two end plates, the cavity of the case body is enclosed by the two side plates and the two end plates, and the output electrode assembly is arranged on any one of the two end plates; and
   wherein a locating piece is provided on an end of each of the two side plates close to the end cap, and the locating piece fits and limits the end cap.

10. The battery module according to claim 9, wherein the locating piece comprises:
    a connecting arm connected to each of the two side plates; and
    a fixed arm connected to the connecting arm in a non-zero angle with respect to the connecting arm,
    wherein the end cap is clamped by the fixed arms corresponding to the two side plates.

11. The battery module according to claim 10, wherein the fixed arm is connected to the connecting arm via an arc transition.

12. The battery module according to claim 11, wherein a surface of the end cap to be matched with the fixed arm is an arc surface.

* * * * *